Patented Aug. 28, 1945

2,383,827

UNITED STATES PATENT OFFICE 2,383,827

PROCESS OF PREPARING SILICONE RESINS

Murray M. Sprung, Scotia, N. Y., assignor to General Electric Company, a corporation of New York No Drawing. Application February 1, 1943, Serial No. 474,335

9 Claims. (Cl. 260—2)

The present invention relates to the preparation of silicone resins. It is particularly concerned with a process of preparing resins of improved properties from the resinous intermediate condensation products obtained by hydrolyzing compositions comprising one or more organo-silicon halides having the general formula $R_aSiX_{4-a}$ wherein R represents a hydrocarbon radical, specifically an alkyl, aryl (including alkaryl), or aralkyl radical, X represents a halogen atom, specifically a chlorine or bromine atom, and $a$ is a whole number and is at least 1 and not more than 2. Preferably, the intermediate condensation products treated in accordance with this invention are those obtained by hydrolyzing mixtures of such organo-silicon halides and a silicon tetrahalide such as silicon tetrachloride or silicon tetrabromide.

The copending application Serial No. 455,615, filed August 21, 1942, in the names of J. G. E. Wright and James Marsden and assigned to the same assignee as the present invention describes and claims a process of improving the heat- and age-resistance, flexibility, and curing rate of intermediate silicone hydrolysis or condensation products. The intermediate silicones may be prepared for example by adding a solution of organo-silicon halides in an inert solvent, such as toluene, to a hydrolysis medium comprising a mixture of water, an inert solvent, such as toluene, and an alcohol, such as butyl alcohol, amyl alcohol, or the like. In accordance with the Wright and Marsden invention, the resultant resinous hydrolysis product is dissolved in a diluent, such as toluene or a mixture of toluene with methyl amyl ketone, tertiary amyl alcohol or the like, and the solution is heated to reflux temperatures in contact with certain catalysts or catalyst combinations comprising hydrated ferric chloride, mixtures of hydrated ferric chloride and antimony pentachloride, etc. This catalytic treatment is believed to involve various complex processes, the nature of which is not clearly understood, but which are believed to include an opening up of ring compounds and a subsequent re-condensation and rearrangement of the products to form new resinous materials.

The present invention is based on my discovery that when this catalytic treatment is carried out under partial distillation conditions, that is, under such conditions such that a portion of the solvent and other volatile components of the reaction mass is caused to distill out of the reaction vessel during the course of the catalytic treatment, a resinous product is obtained which is superior to previously known silicone resins in one or more of the following properties: speed and range of cure; length of the brittle range after cure is effected; and craze resistance, flexibility, abrasion resistance, dielectric strength and film thickness of the heat-hardened films. Improvements in the above-mentioned properties are particularly noticeable when the solvent or diluent used in the practice of my invention is a mixture of toluene (or an equivalent aromatic solvent) and tertiary amyl alcohol. I therefore prefer to treat silicone hydrolysis products which have been prepared by adding a solution of organo-silicon halides in an inert aromatic solvent such as toluene, benzene, or xylene to a mixture of water, an inert aromatic solvent, and tertiary amyl alcohol, since it is not necessary to separate the resinous hydrolysis products from the solvent components of the hydrolysis medium prior to the catalytic treatment.

My preferred process comprises hydrolyzing an organo-silicon halide mixture by slowly adding a solution thereof in toluene to a mixture of water, toluene and tertiary amyl alcohol, washing the solution of the hydrolysis products with water to remove the hydrogen halides formed during hydrolysis, and then centrifuging the washed solution to remove the final traces of water and any gelled products, small amounts of which may or may not be present. The washed solution of the intermediate, heat-hardenable silicone condensation product is brought to the proper resin base content by the addition of toluene and is then heated under partial distillation conditions with a catalyst which is preferably a hydrated ferric chloride or a mixture of hydrated ferric chloride and anhydrous antimony pentachloride. Ordinarily the preferred quantity of distillate (which includes some water and some of the solvent) removed during the treatment depends on the concentration of the original mixture and on the particular resin being treated. After the treated resin solution is washed and centrifuged to remove the metal salts and any water remaining in the solution, it may be concentrated to the extent necessary to obtain a usable varnish.

The following examples will serve to indicate more clearly the nature and scope of my invention.

*Example 1*

An intermediate methylphenyl silicone resin was prepared from a mixture of 205 grams silicon tetrachloride, 510 grams phenyl silicon trichloride, 305 grams diphenyl silicon dichloride, 360 grams methyl silicon trichloride, and 620 grams dimethyl silicon dichloride by adding a solution of this mixture in 660 grams toluene to a mixture of 1320 grams tertiary amyl alcohol, 660 grams toluene and 6660 grams water. After washing the hydrolysis products to remove the hydrochloric acid, etc., the final traces of water were removed by centrifuging and the resulting resin solution, having a resin base content of 41.5 per cent, was divided into two parts. All the solvent was removed from the resin component of part (A) by distillation, after which it was refluxed for 2 hours in 30 per cent toluene solution with 5 per cent antimony pentachloride and 3 per cent hydrated ferric chloride based on the weight of the resin. Part (B) was diluted directly to 30 per cent base with toluene, and then heated with the same proportions of metal halides in an apparatus devised to accomplish a gradual removal of part of the volatile reaction components by distillation. About 72 grams of water and 320 grams of organic material were removed during this operation and the liquid temperature of the reaction mixture rose concomitantly from 85° to 100° C. Both solutions were washed with water, filtered, and concentrated by heating to about 130° C. Both resins gave hard, glossy, brittle films when cured on glass tape at temperatures between 200° and 300° C. Films of the resin from part (B) when subsequently heated for 1 minute at 450°, for 3 to 5 minutes at 400° C., or for 1 hour at 375° C. were no longer brittle and showed a dielectric strength in excess of 1000 volts per mil. Films from part (A) however were still brittle when heat-treated in the same manner.

*Example 2*

(A) A methyl silicone intermediate condensation product was prepared by slowly adding a mixture of 433 grams silicon tetrachloride, 167 grams dimethyl silicon dichloride, 1200 grams of a mixture of monomethyl silicon trichloride and dimethyl silicon dichloride having a chlorine content of 59.93 per cent with 600 grams toluene to a mixture of 600 grams toluene, 1200 grams tertiary amyl alcohol, and 6000 grams water. The toluene-alcohol solution of the hydrolysis product was washed twice with 1200 grams water and centrifuged to remove the remaining water and a small amount of gel. This gave a resin solution having a resin base content of 39.5 per cent. To 2000 grams of this solution was added a mixture of 39.5 grams antimony pentachloride, 23.7 grams hydrated ferric chloride, and 1160 grams toluene. The resultant mixture, containing 25 per cent by weight of resin, was heated in a flask provided with a water-cooled upright reflux condenser for 2½ hours in accordance with the process described in the above-mentioned Wright and Marsden application. The product was washed five times with water, centrifuged to remove the metallic salts and was thereafter concentrated to a resin base content of 85 per cent. This varnish was applied to glass tape in the usual manner. The resulting films, which required about 15 minutes heating at 200° C. to cure to a tack-free state, had a crazing time of about 5 to 15 hours at 300° C. and about 50 hours at 275° C. The dielectric strength of 3 mil glass tape coated with this resin to an overall thickness of 6 mils ranged from 500 to 800 volts per mil.

(B) The preparation described in part (A) was repeated using the same proportions of materials except that the treatment with catalysts was carried out under such conditions that a portion of the solvent present in the reaction mixture was distilled off during the process. During a heating period of slightly over 2 hours, 35 c. c. of water and 470 c. c. of solvent mixture were removed by such partial distillation and the temperature of the boiling liquid rose from 85° to 95° C. The resinous product was washed, centrifuged, and concentrated in the same manner as was the resinous product of part (A). The resultant resin was much superior to that of part (A). Films thereof on glass fiber tape cured to a tack-free state in about 3 minutes at 150° C. The cured films had a crazing time of 60 hours at 300° C. and 375 hours at 275° C. The dielectric strength of cured films on 3 mil glass tape having overall thicknesses of 6 mils ranged from 1000 to 1200 volts per mil.

*Example 3*

A mixture of chlorosilanes was made up from 212 grams silicon tetrachloride, 807 grams phenyl silicon trichloride, 375 grams dimethyl silicon dichloride, and 619 grams of a mixture of dimethyl silicon dichloride and methyl silicon trichloride having a chlorine content of 59.4 per cent. This chlorosilane mixture was diluted with 660 grams toluene and hydrolyzed by running it slowly into a mixture of 6660 grams water, 1320 grams tertiary-amyl alcohol, and 660 grams toluene. The hydrolysis required ½ hour at 15-25° C. After washing twice with 2500 c. c. of water and filtering, there was obtained 2825 grams of a methylphenyl silicone solution having a resin content of 41.5 per cent.

Six hundred grams of this dilute resin solution was concentrated by vacuum distillation, thus giving 260 grams of a solvent-free, viscous, syrupy resin, which was divided into two parts of 130 grams each.

Five catalytic treatments were then carried out, the conditions for which are enumerated below.

A. 300 grams of the dilute resin solution was mixed with 3.75 grams hydrated ferric chloride and 6.25 grams antimony pentachloride, diluted with 75 grams toluene and the mixture heated in an apparatus designed to remove part of the solvents during the catalytic process. During a 2-hour period, 12 c. c. of water and 87 c. c. of solvents were removed. The liquid temperature rose from 84.5° C. to 100° C. during this time.

B. 300 grams of the dilute resin solution were treated with the same reagents as in A, but the mixture was refluxed for a two-hour period without distillation of solvents. The liquid temperature ranged between 83.5° to 84.5° C.

C. One of the 130 gram portions of the solvent-free resin was mixed with 3.75 grams hydrated ferric chloride, 6.25 grams antimony pentachloride, and 245 grams of toluene and heated in the apparatus used in A. During a heating period of 1½ hours (temp. 95°-109°), 5 c. c. of water and 40 c. c. of toluene were distilled off.

D. The second 130 gram portion of the concentrated resin was mixed with the same proportions of reagents as in C and then heated under reflux conditions for 1½ hours (temp. 89.5°-91.5°).

E. Fifteen hundred grams of the dilute resin solution was diluted with 375 grams of toluene (to 33⅓ per cent resin content) and treated with 18.75 grams of hydrated ferric chloride in the apparatus used in A and C. During a heating period of 2¾ hours the liquid temperature rose from 85.5° to 96.5° C. About 72 c. c. of water and 290 c. c. of solvents were removed by partial distillation during the catalytic process. All five solutions were worked up in the same manner, namely, by running into water, filtering by suction, washing with water until neutral, and filtering by gravity. Portions of the resulting resin solutions were concentrated by heating in open receptacles until the liquid temperature reached 120–130° C. Coated tapes were then prepared by dipping glass cloth in the concentrated solutions and curing the coating in an oven at 200° C. The tapes were finally aged to electrical breakdown at 300° C. The appended table summarizes the properties of the films thus obtained.

| Resin # | Cure time to tack-free state | Time to reach flexible state 300° C. | Average dielectric strength | Craze time at 300° C. |
|---|---|---|---|---|
| | | Hours | Volts/mil | Hours |
| A | 7 min. at 150° | 5 | 1,050 | 100 |
| B | 60 min. at 200° | 1½ | 800 | 45 |
| C | 3 min. at 150° | 55–80 | 1,000 | 100–180 |
| D | 10 min. at 150° | 1 | 1,100 | 55 |
| E | 12 min. at 200° | ½ | 1,050 | 140 |

It is evident from the above that the partial distillation procedure produces a more heat-resistant product than does the reflux procedure. However, to concentrate the resin solution previous to catalytic treatment is less desirable than to leave all solvents in before addition of the catalysts. In the above series, the most brittle products were obtained when the partial distillation procedure was applied to a resin which had been first concentrated and then diluted to the usual extent with toluene alone. Obviously, it is most desirable economically to use either the procedure of A or that of E which differ only in the nature of the catalyst.

*Example 4*

A methylphenyl silicone solution was prepared adding a toluene solution of a mixture of 205 grams silicon tetrachloride, 1020 grams phenyl silicon trichloride, and 775 grams dimethyl silicon dichloride to a mixture of toluene, tertiary-amyl alcohol, and water. The catalytic treatment of the resultant solution of methylphenyl silicone in a mixture of toluene and tertiary-amyl alcohol was carried out at 30 per cent resin base employing 5 per cent antimony pentachloride and 3 per cent ferric chloride based on the weight of the resin. During a two-hour heating period 115 grams of water and 1035 grams of solvents were removed. The resin solution thus obtained was concentrated to about 80 per cent resin base content and applied to glass tape. Smooth glossy films were obtained which were, however, very brittle. The dielectric strength was low due to cracks which were formed mechanically when the brittle films were handled. However, when these coated and impregnated tapes were baked for about 5 minutes at 200° C. and then for 10 minutes more at 400° C. the baked tapes were found to be smooth and flexible and to have dielectric strengths averaging about 1500 volts per mil. Further heating for 2 hours at 400° C. did not materially impair the dielectric strength.

*Example 5*

A methylphenyl silicone resin solution of 41.8 per cent base content was prepared by hydrolyzing a mixture of 320 grams silicon tetrachloride, 790 grams phenyl silicon trichloride, 845 grams dimethyl silicon dichloride, and 45 grams methyl silicon trichloride employing a toluene-tertiary amyl alcohol-water hydrolysis medium. After removal of water, the solution was reduced to 33⅓ per cent resin base content by the addition of toluene and heated with 5 per cent antimony pentachloride and 3 per cent hydrated ferric chloride based on the weight of the resin in a three-necked flask equipped with a stirrer, a water-cooled reflux condenser, a modified Vigreux type column, and a liquid separating trap allowing the removal of water and part of the solvents and the return of the remaining portion of the solvents to the flask. During three hours, a total 127 grams of water and 400 grams of solvents were removed from the reaction mixture and the liquid temperature of the reaction mixture rose from 83° to 94° C. The washed and filtered solution was concentrated to 83 per cent resin base by heating until the liquid temperature was 120° C. Flexible films of the resin were obtained on glass tape after baking for 30 minutes at 300° C. The dielectric strength of 3 mil glass tapes coated to an overall thickness of 6–7 mils was in excess of 1200 volts/mil. Coated glass fiber tape was also prepared in a coating apparatus in which the resin coated tape passed through a 28-foot heating tower and then through a 10-foot "booster" heating tower. A 3-mil glass fiber tape was run through the resin solution (heated to 60° C.) at a speed of 24 inches per minute. The temperatures in the 28-foot tower varied from a minimum of about 100° at the bottom to a maximum of about 200° at the top. In the 10-foot "booster" tower, the temperatures varied from about 300° C. to about 400° C. The coated tape emerging from the 28-foot tower was dry, smooth, and very flexible, but was not completely cured. At this point, the tape, which had an overall thickness of 5–5.5 mils, had a dielectric strength of 1300–1600 volts per mil. After the coated tape had passed through both heating towers, it was hard, smooth, still reasonably flexible and had a dielectric strength of 1250–1650 volts per mil. After aging for 70 hours at 300° C., the dielectric strength was still in excess of 1000 volts per mil. "Crazed spots" began to appear only after about 80 hours heating at 300° C.

It is to be understood that my invention is not limited to the specific organo-silicones or proportions set forth in the above examples. The optimum resin and catalyst concentration depends to a certain extent on the particular organo-silicone resin treated, the type of catalyst used, and the particular properties desired in the final product. The effects of these various factors are more fully discussed in the copending Wright and Marsden application referred to hereinbefore. In general, the resin concentration should not exceed about 33 per cent by weight of the solution at the beginning of the catalytic treatment, as otherwise the resin may gel during such treatment. The resin concentration may be as low as 10 per cent by weight of the solution although when working with such dilute resin solutions, it may be found necessary to increase the catalyst concentration above that normally employed.

When the original resin base content of the solution undergoing catalytic treatment ranges from 20 to 30 per cent by weight, the preferred catalyst is about 3 per cent ferric chloride hexahydrate, or a mixture of about 5 per cent antimony pentachloride and 3 per cent ferric chloride hexahydrate based on the weight of the resin. Other catalysts or catalyst combinations such as hydrated ferrous chloride, hydrated stannic chloride, alone or combined with condensing agents such as anhydrous ferric chloride, aluminum chloride, or antimony trichloride, may also be used as described in the aforementioned Wright and Marsden application with appropriate modification of the catalyst concentration. In general, it may be said that the amount of catalyst employed should be between 1 and 15 per cent by weight based on the weight of the resin.

The preferred amount of distillate removed during the herein described treatment, employing any given apparatus is understandably dependent upon the particular resin undergoing treatment, the concentration of the resin solution, the length of the treating period, and the temperature of the solution during such treatment. As no particular advantage appears to result from longer periods of treatment, a two to three hour heating period is ordinarily employed and the heat applied to the reaction mass is so regulated that the amount of distillate removed by distillation is at least 10 per cent by volume based on the original volume of the solvents in the solution. Generally, the amount of distillate, including the water, removed during precondensation, is considerably greater than 10 per cent, usually from 15 to 40 per cent, and preferably about 25 per cent by volume, based on the volume of the original solvent or solvent mixture. In general, enough of the volatile material, i. e. distillate, should be removed to obtain a rise of at least about ten degrees in the boiling temperature of the resin solution.

The composition of the distillate is dependent on the solvent or solvent mixtures employed. Some water is always present. This water may be formed by further condensation of silicols present in the resins. At least part of the water may come from the hydrated salt which appears to be an essential component of the catalyst. Another constituent of the distillate is toluene. When amyl alcohol is present, this alcohol and its derivatives and decomposition products including amyl chloride and amylene may be present in the distillate. In such cases, amylene may constitute as much as 10 to 20 per cent or more of the distillate. In general, catalysts that do not cause the formation of amylene when tertiary amyl alcohol is present in the original solution do not appear to give products of high craze resistance or dielectric strength. However, the presence of amylene in this distillate is not to be construed as essential to the production of an improved resinous composition by the general processes herein disclosed since it is within the scope of my invention to carry out the catalytic process in non-alcoholic solution.

My process, using a mixture of toluene and tertiary-amyl alcohol, appears to be particularly applicable to methylphenyl silicones obtained by hydrolysis of suitable mixtures of methyl silicon halides, phenyl silicon halides, and silicon tetrahalides. The methylphenyl silicones which have been treated with the appropriate catalysts under partial distillation conditions possess superior mechanical and electrical properties as compared with those treated under reflux conditions. As has been previously stated, a particular advantage of the process employing toluene and tertiary amyl alcohol as the solvent combination is that a mixture of the solvents may be used in hydrolysis of the organo-silicon halides, thus avoiding concentration of the hydrolysis product prior to catalytic treatment. This procedure involves an economy of time, materials, and equipment.

The products of my invention may be used for any of the numerous applications for which silicone resins have previously been used. Typical applications for the silicone resins are as coatings and impregnants for sheet materials, such as glass fiber cloth, in making electrical sheet insulation, as binders for electrical coils, as the insulating coating for wires or their conducting media, as the resinous base of semi-conducting paints, etc.

What I claim as new and desire to secure by Letters Patent of the United States is:

1. The process which comprises heating a solution of an organo-silicone resin in a solvent comprising an inert aromatic liquid selected from the group consisting of toluene, benzene, and xylene in contact with a catalyst comprising a hydrated metal salt selected from the group consisting of hydrated halides of iron and tin under conditions such that at least 10 per cent of the non-resinous components of the solution are removed by distillation, the said resin being the product of hydrolysis of a composition comprising an organo-silicon halide selected from the group consisting of alkyl, aryl, and aralkyl silicon halides.

2. The process which comprises forming a solution of an organo-silicone resin in a mixture of tertiary amyl alcohol and an inert hydrocarbon solvent selected from the group consisting of toluene, benzene, and xylene and heating said solution under partial distillation conditions and in contact with a catalyst comprising a hydrated ferric chloride until at least a ten degree rise in the boiling temperature of the resin solution is obtained, the said resin being that obtained by hydrolyzing a mixture of organo-silicon halides selected from the group consisting of alkyl, aryl, and aralkyl silicon halides and containing an average of not more than two organo groups per silicon.

3. The process which comprises hydrolyzing a mixture of organo-silicon halides containing an average of not more than two organo groups per silicon and being selected from the class consisting of alkyl, aryl, and aralkyl silicon halides by slowly adding a solution thereof in an inert aromatic hydrocarbon solvent selected from the group consisting of toluene, benzene, and xylene to a mixture of an aromatic hydrocarbon solvent, tertiary amyl alcohol and water, recovering from the resultant mixture an organic solution of the organo-silicon hydrolysis products and heating said solution under partial distillation conditions in contact with a catalyst comprising a hydrated metal halide selected from the group consisting of hydrated halides of iron and tin, and continuing the heating until more than a ten degree rise in the boiling temperature of the solution is obtained.

4. The process of claim 3 wherein the inert aromatic solvent is toluene.

5. The process of claim 3 wherein the hydrated metal halide is hydrated ferric chloride.

6. The process which comprises heating, under partial distillation conditions and in contact with a mixture of hydrated ferric chloride and antimony pentachloride, a toluene-tertiary amyl alcohol solution of an organo-silicon resinous composition obtained by hydrolyzing a mixture of organo-silicon halides selected from the group consisting of alkyl, aryl, and aralkyl silicon halides and silicon tetrahalide and continuing said heating until at least 10 per cent by volume of distillate is removed from said solution.

7. The process of claim 6 wherein the organo-silicon halides are methyl silicon halides and phenyl silicon halides.

8. The process which comprises heating a liquid methylphenyl silicone resin while in solution in a mixture of toluene and tertiary amyl alcohol in contact with a mixture of hydrated ferric chloride and antimony pentachloride under partial distillation conditions such that from 15 to 40 per cent by weight of the volatile components of the mixture is removed during the heating step.

9. The process which comprises heating a solution of methyl-silicone resin in a solvent comprising tertiary amyl alcohol and an inert aromatic liquid hydrocarbon selected from the group consisting of toluene, benzene, and xylene in contact with a catalyst comprising a hydrated metal halide selected from the group consisting of hydrated halides of iron and tin under partial distillation conditions such that the boiling temperature of the solution is raised substantially 10 degrees centigrade.

MURRAY M. SPRUNG.